United States Patent [19]

Sasaki et al.

[11] Patent Number: 5,290,858
[45] Date of Patent: Mar. 1, 1994

[54] CORE-SHELL POLYMER, PRODUCTION AND USE THEREOF

[75] Inventors: Ichiro Sasaki, Suita; Junji Oshima, Toyonaka; Minoru Yamada, Kawanishi, all of Japan

[73] Assignee: Takeda Chemical Industries, Ltd., Osaka, Japan

[21] Appl. No.: 957,793

[22] Filed: Oct. 8, 1992

Related U.S. Application Data

[60] Division of Ser. No. 810,439, Dec. 19, 1991, Pat. No. 5,183,858, which is a continuation of Ser. No. 501,761, Mar. 30, 1990, abandoned.

[30] Foreign Application Priority Data

Mar. 31, 1989 [JP] Japan .................. 1-81826

[51] Int. Cl.$^5$ .............................. C08L 51/04
[52] U.S. Cl. .......................... 525/64; 525/308
[58] Field of Search ........................... 525/64

[56] References Cited

U.S. PATENT DOCUMENTS

| | | | |
|---|---|---|---|
| 3,749,755 | 7/1973 | Bronstert et al. | 260/876 R |
| 4,308,335 | 12/1981 | Yamamoto | 525/902 |
| 4,442,264 | 4/1984 | Zabrocki et al. | 525/293 |
| 4,473,679 | 9/1984 | Falk et al. | 524/432 |
| 4,556,690 | 12/1985 | Nakagawa | 525/64 |
| 4,639,488 | 2/1987 | Schuette et al. | 524/456 |
| 4,665,126 | 5/1987 | Kusumgar et al. | 525/66 |
| 4,713,414 | 12/1987 | Kusumgar | 525/64 |
| 4,778,850 | 10/1988 | Lindner et al. | 525/83 |
| 4,804,716 | 2/1989 | Flexman, Jr. | 525/389 |
| 5,006,592 | 4/1991 | Oshima et al. | 525/64 |
| 5,039,741 | 8/1991 | Burg et al. | 525/57 |
| 5,183,859 | 2/1993 | Sasaki et al. | 525/309 |

FOREIGN PATENT DOCUMENTS

| | | |
|---|---|---|
| 0115373 | 8/1984 | European Pat. Off. . |
| 0265142 | 4/1988 | European Pat. Off. . |
| 0299469 | 1/1989 | European Pat. Off. . |
| 0305273 | 3/1989 | European Pat. Off. . |
| 59-15331 | 4/1984 | Japan . |
| 2091744 | 8/1982 | United Kingdom . |
| 2196011 | 4/1988 | United Kingdom . |

*Primary Examiner*—Vasu S. Jagannathan
*Attorney, Agent, or Firm*—Wenderoth, Lind & Ponack

[57] ABSTRACT

This invention relates to a core-shell polymer which is useful for polyoxymethylene resin, a polyoxymethylene resin composition containing the core-shell polymer and a molded article made of the polyoxymethylene resin composition.

The core-shell polymer comprises a rubbery polymer core and a glassy polymer shell and has substanially no detectable anion.

This core-shell polymer makes the molded articles be improved on the impact strength, elongation at the weld line, etc. The molded articles is used as various products (such as gears, reels, etc.).

6 Claims, No Drawings

CORE-SHELL POLYMER, PRODUCTION AND USE THEREOF

This application is a division of application Ser. No. 07/810,439, filed Dec. 19, 1991, (now U.S. Pat. No. 5,183,858), which application is a continuation of now abandoned application Ser. No. 07/501,761, filed Mar. 30, 1990.

The present invention relates to a core-shell polymer for polyoxymethylene resin and a polyoxymethylene resin composition with improved impact strength which contains said core-shell polymer as melt-blended.

BACKGROUND OF THIS INVENTION

Polyoxymethylene (POM) resin has recently been used as a molding material for various end products (such as gears, reels, etc.) but the molded articles manufactured from this resin are not fully satisfactory in impact strength, thus setting many attempts going to improve POM in this respect.

However, for chemical structural reasons, POM resin has had no partner resin that is sufficiently compatible with it. Furthermore, POM resin is not thermally stable and, therefore, not suited for high-temperature blending.

A variety of core-shell polymers have been proposed for incorporation in many thermoplastic resins by the melt-blending technique for the purpose of, in the main, improving the impact strength of the final resin. Among them, a core-shell polymer comprising a rubbery polymer core and a glassy polymer shell has the advantage that its dispersibility is less sensitive to variations in melt-blending conditions and hence it can be uniformly dispersed with high reproducibility. These core-shell polymers are used as an impact modifiers for polycarbonate, poly(butylene terephthalate), polyamide, polyphenyleneoxide and their mixture, polymer alloy.

However, the prior art core-shell polymers have the disadvantage that the core-shell polymer contains the ingredient which promotes thermal decompsition of POM, due to drawbacks in the methods employed for their synthesis. Therefore, they can hardly be evenly blended with POM resin. Furthermore, even if they could be blended with POM resin more or less successfully, the resulting compositions are poor in thermal stability.

European Patent Laid-open Publication No. 115,373 discloses a POM resin composition containing a rubbery elastomer obtainable on emulsion polymerization of an $C_{1-8}$ alkyl acrylate but as the special blending conditions are indicated therein, a fully stable POM resin composition is hard to come by under the ordinary blending conditions. Moreover, the composition is not improved in its thermal stability because of no consideration at the emulsion polymerization.

U.S. Pat. No. 4,713,414 discloses a POM resin composition containing core-shell polymers and reactive titanate. But this core-shell polymer also contains impurities decomposing POM resin. Therefore, a stable POM resin composition cannot be produced. A comparative example between core-shell polymers of this invention and of U.S. Pat. No. 4,713,414 and EP-A-115,373 is disclosed as a comparative example 1 in this application.

As a POM resin composition assuring an improved impact strength, the composition proposed in U.S. Pat. No. 4,804,716 is known. While it is a POM resin composition capable of forming a thermoplastic IPN (interpenetrating polymer network) with a polyurethane elastomer, assurance of sufficiently high impact strength calls for the use of a fairly large amount of polyurethane elastomer which should detract considerably from the modulus of the molded article, let alone the disadvantages of inadequate thermal stability and fluidity.

U.S. Pat. No. 4,639,488 discloses a POM resin composition containing a rubbery elastomer obtainable by emulsion polymerization of butadiene but this composition is also lacking in thermal stability.

U.S. Pat. No. 3,749,755 discloses a POM resin composition containing a rubbery grafted elastomer. But this composition is lacking in thermal stability and the rubbery grafted elastomer is not described as a core-shell polymer.

Japanese Patent Examined No. 15331/1984 discloses a method for producing a thermoplastic resin like acrylonitrile-acrylate-styrene (AAS resin) using emulsion polymerization technique improved on impact strength. This is, however, copolymer not a blend mixture.

European Patent Laid-open Publication No. 305,273 discloses a method of preparation for latex using nonionic surfactant. This latex, however, is used to toughen a vinyl polymer, and is not a core-shell polymer.

Polymer blend composed of crystaline polymer has the defect that it has low strength and elongation on the weld line. POM is a highly crystaline polymer. Therefore, the POM composition incorporated with polyurethane elastomer in order to improve impact strength shows much lower strength and elongation on the weld line than pure POM.

Moreover, POM does not have good weatherability among engineering plastics. The POM composition incorporated in particular with polyurethane elastomer shows much inferior weatherability.

The present inventors have made intensive investigations to improve impact strength, thermal stability, strength and elongation on the weld line, and weatherability of POM compositions. From the investigation, they have found that the POM composition comprising a certain core-shell polymer shows much higher impact strength and better weatherability than the pure POM. The POM composition also has improved thermal stability, and strength and elongation on the weld line.

DETAILED DESCRIPTION OF THIS INVENTION

The present inventors conducted an intensive and diligent research for developing a core-shell polymer capable of providing a POM resin composition with improved impact strength and discovered that the polymerization initiator and surfactant heretofore used in the polymerization reaction exert adverse effects on the thermal stability of POM resin.

After further investigation, they discovered that the above-mentioned disadvantage can be overcome by incorporating a core-shell polymer having the undermentioned structure in the resin composition and accordingly completed the present invention.

The present invention relates to a core-shell polymer comprising a rubbery polymer core and a glassy polymer shell and containing substantially no detectable anion, a method of producing said core-shell polymer, and a polyoxymethylene resin composition containing said core-shell polymer.

The core-shell polymer of the invention is produced by emulsion polymerization. In this core-shell polymer, no anion can be detected by the usual anion detection technique.

Examples of methods for detecting anion include a method comprising stirring 5 g of core-shell polymers in 20 ml of, distilled water for 3 hours at room temperature, filtering the core-shell polymer solution to obtain filtrate, dividing the filtrate into two parts of the same volume, adding 0.1 ml of 1% barium chloride aqueous solution into one part of the filtrate and comparing the solution with another filtrate. If sulfate anion is contained in the filtrate, precipitate was observed in the solution having barium chloride added thereto.

Another method comprises stirring 5 g of core-shell polymers in 20 ml of distilled water for 3 hours at room temperature, filtering the core-shell polymer solution to obtain filtrate, dividing the filtrate into two parts of the same volume, adding 0.5 ml of 0.1N silver nitrate aqueous solution into one part of the filtrate and comparing the solution with another filtrate. If halogen anion is contained in the filtrate, precipitate was observed in the solution having silver nitrate added thereto.

An anion such as metal carboxylate, etc. can be also detected by a conventional method. In this invention the core-shell polymer is substantially free from an anion such as metal carboxylate, etc.

In accordance with the invention, the emulsion polymerization can be conducted using, for example, the following surfactant and polymerization initiator.

With regard to the surfactant, a large majority of the nonionic surfactants in common use can be utilized. Thus, for example, nonionic surfactants of the ether type such as polyoxyethylene nonylphenyl ether, polyoxyethylene stearyl ether, polyoxyethylene lauryl ether, etc., nonionic surfactants of the ester type such as polyoxyethylene monostearate, etc., nonionic surfactants of the sorbitan ester type such as polyoxyethylene sorbitan monolaurate, etc. and nonionic surfactants of block copolymer type such as polyoxyethylene polyoxypropylene block copolymer, etc. may be mentioned. The level of addition of the surfactant is chosen according to the particle-stabilizing activity of the surfactant. The surfactants used in Examples of this application are preferably used. More preferably polyoxyethylene nonylphenylether is used.

Since those surfactants are nonionic, they do not liberate anions, thus causing little decomposition in the POM resin.

With regard to the polymerization initiator which liberates neutral radicals, there may be employed initiators of the azo type, such as azobis(isobutyronitrile), dimethyl 2,2'-azobis(isobutyrate), 2,2'-azobis(2-aminopropane).2HCl etc. and peroxides such as cumene hydroperoxide, diisopropylbenzene hydroperoxide, hydrogen peroxide and the like.

All of these polymerization initiators do not introduce anions into the terminals of the product core-shell polymer, thus causing little decomposition of the POM resin. Preferably an initiator of azo type and of peroxide type are used.

Thus, when the emulsion polymerization is carried out in a reaction system using an anion-free surfactant and an anion-free polymerization initiator, the resulting core-shell polymer is also definitly free of anion. This core-shell polymer free of anion is preferred. In another aspect, a core-shell polymer having a few anions for which the amount cannot be detected by the method mentioned above can be used in this invention.

The POM resin composition prepared using such a core-shell polymer is excellent in impact strength.

The core-shell polymer according to this invention is produced by the seeded emulsion polymerization technique which is a serial multi-stage emulsion polymerization process such that the polymer formed in a preceding stage is successively covered with a polymer formed in a later stage.

For producing the seed of the emulsion polymerization, the preferred procedure comprises mixing the monomer, surfactant and water, feeding the mixture to a reactor and adding the polymerization initiator. In other words, the monomer droplets are preferably comminuted beforehand.

The above pretreatment may, for example, be effected using a disperser or homogenizer until the mixture of monomer, surfactant and water is sufficiently emulsified.

The first-stage polymerization is a reaction giving rise to a rubbery polymer.

As the monomer forming said rubbery polymer, a conjugated diene or a $C_{2-8}$ alkyl acrylate, or a mixture thereof can be mentioned.

The above monomer or monomers are polymerized to give a rubbery polymer with a glass transition temperature not over $-30°$ C.

While butadiene, isoprene, chloroprene, etc. can be mentioned as examples of the conjugated diene, butadiene is particularly advantageous.

As examples of the $C_{2-8}$ alkyl acrylate, there may be mentioned ethyl acrylate, propyl acrylate, butyl acrylate, cyclohexyl acrylate, 2-ethylhexyl acrylate, etc., although butyl acrylate is particularly preferred.

In the first-stage polymerization, the conjugated diene and/or alkyl acrylate may be copolymerized with other comonomers such as aromatic vinyl or vinylidene monomers, e.g. styrene, vinyltoluene, α-methylstyrene, etc., vinyl or vinylidene cyanides, e.g. acrylonitrile, methacrylonitrile, etc., and alkyl methacrylates, e.g. methyl methacrylate, butyl methacrylate and so on.

In case the first-stage polymerization system does not involve a conjugated diene or, if it does, involves it only in a proportion of not more than 20 weight % of the total first-stage monomer charge, a high impact strength can be realized by using small amounts of a crosslinking monomer and a grafting monomer.

Examples of the crosslinking monomer include aromatic divinyl monomers such as divinylbenzene etc., alkane polyol polyacrylates and alkane polyol polymethacrylates such as ethylene glycol diacrylate, ethylene glycol dimethacrylate, butylene glycol diacrylate, hexanediol diacrylate, hexanediol dimethacrylate, oligoethylene glycol diacrylate, oligoethylene glycol dimethacrylate, trimethylolpropane diacrylate, trimethylolpropane dimethacrylate, trimethylolpropane triacrylate, trimethylolpropane trimethacrylate, etc. Particularly preferred are butylene glycol diacrylate and hexanediol diacrylate.

Examples of the grafting monomer include unsaturated carboxylic acid allyl esters such as allyl acrylate, allyl methacrylate, diallyl maleate, diallyl fumarate, diallyl itaconate and so on. Particularly preferred is allyl methacrylate.

The crosslinking and grafting monomers mentioned above are each used in the range of 0.01 to 5 weight %, preferably 0.1 to 2 weight %, based on the total weight of the first-stage monomer charge.

This rubbery polymer core phase preferably accounts for 50 to 90 weight % of the total core-shell polymer. If the proportion of the rubbery core phase is either less or more than the above limits, the resin composition prepared by melt-blending of the core-shell polymer may not have been fully improved in impact strength.

If the glass transition temperature of the rubbery core phase is higher than $-30°$ C., the improvement in low-temperature impact strength may not be as great as desired.

The outer shell phase is constituted by a glassy polymer.

As examples of the monomer forming this glassy polymer, there may be mentioned methyl methacrylate and various monomers copolymerizable with methyl methacrylate.

This monomer is either methyl methacrylate or a mixture of methyl methacrylate and one or more monomers copolymerizable therewith, and forms a glassy polymer with a glass transition temperature of not less than 60° C.

Examples of the monomers copolymerizable with methyl methacrylate include alkyl acrylates such as ethyl acrylate, butyl acrylate, etc., alkyl methacrylates such as ethyl methacrylate, butyl methacrylate, etc., aromatic vinyl or vinylidene monomers such as styrene, vinyltoluene, $\alpha$-methylstyrene, etc., vinyl or vinylidene cyanides such as acrylonitrile, methacrylonitrile and the like. Particularly preferred are ethyl acrylate, styrene and acrylonitrile.

The outer shell phase preferably accounts for 10 to 50 weight % of the total core-shell polymer. If the proportion of this outer phase is more or less than the above limits, the resin composition obtainable by melt-blending the resulting core-shell polymer with POM resin may not have been sufficiently improved in impact strength.

Further, the core-shell polymer may have an intermediate phase between the first rubbery polymer phase and the outer glassy polmer phase. The polymerization for the intermediate phase can be carried out by a method of emulsion polymerization. For example, the intermediate phase can be obtained by polymerizing one or more monomers selected from the group of polymerizable monomers having a functional group such as glycidyl methacrylate, unsaturated carboxylic acid, etc, polymerizable monomers for a glassy polymer such as methyl methacrylate, styrene, etc., and polymerizable monomers for a rubbery polymer such as butyl acrylate, butadiene, etc. The monomer for polymerization of the intermediate phase can be suitably selected according to its property.

The amount of the intermediate phase can be also suitably selected according to the polymerized monomer. For example, in the case that the intermediate phase is a glassy polymer, its amount can be calculated as a part of shell phase. In another case that the intermediate phase is a rubbery polymer, its amount can be calculated as a part of the core phase.

The structures of the core-shell polymer having an intermediate phase are exemplified as a multi-layer structures, a salami-type structure, etc. While a core-shell polymer has a multi-layer structure, it contains at least 3 layers, such as a core layer, an intermediate layer on the core layer, a shell layer in the intermediate layer, etc. In another case that a core-shell polymer has a salami-type structure, the intermediate phase is embedded and is dispersed in the core layer in the form of small particles. In this invention any type of core-shell polymer can be used.

The flexural modulus, the heat-distortion temperature, the apparance (the change of chromaticity by refractive index and the suppression of delamination, etc.) can be improved by using the core-shell polymer having the intermediate phase.

The core-shell polymer obtained by the method mentioned above has 100 to 1,000 nm of an average diameter. Preferrably its range is from 120 to 600 nm. The core-shell polymer having the range mentioned above of the diameter is convenient.

The core-shell polymer of the invention can be obtained in the form of granules, flakes, powders or the like, for example by the following procedures.

(1) Using the aforesaid surfactant and polymerization initiator, a latex is prepared by the seed emulsion polymerization method which is known per se.

(2) This latex is subjected to freeze-thaw treatment to separate the polymer.

(3) The polymer is centrifugally dehydrated and dried.

By the above separation procedures, most of the surfactant, etc. used in the emulsion polymerization step can be removed.

The latex obtained in step (2) can be directly dried and used as it is.

Spray-drying using a spray dryer is also a method for separating the core-shell polymer from the latex.

The core-shell polymer thus separated can be processed into pellets by means of an extruder and a pelletizer, or can be directly melt-blended into the resin and as it is.

The POM resin composition of the invention is a melt-blended mixture of 100 parts by weight of POM resin and 5 to 100 parts by weight, preferably 10 to 80 parts by weight, of the above core-shell polymer.

If the proportion of the core-shell polymer is less than 2 parts by weight, the resulting resin composition may not have been improved in impact strength, while the use of the core-shell polymer in excess of 100 parts by weight may result in considerable decreases in rigidity and heat resistance of the final resin composition.

The POM resin to be used in accordance with the invention includes, among others, a homopolymer of formaldehyde and a copolymer of either formaldehyde or a cyclic oligomer thereof with an oxylalkylene compound containing at least two adjacent carbon atoms in the backbone chain, and any of polyoxymethylene homopolymer and polyoxymethylene copolymer resins can be successfully employed.

For the production of the POM resin composition of the invention, the melt-blending technique is employed.

The melt-blending is generally carried out at an appropriate temperature between 180° and 240° C., where the resin melts and the viscosity of the melt is not too low.

The melt-blending can also be carried out by means of a heating roll, a Bambury mixer or a single-screw or multi-screw extruder.

Furthermore, the resin composition of the invention may contain various additives and other resins in appropriate proportions.

Among such additives are flame retardants, mold-releases, weathering stabilizers, antioxidants, antistatic agents, heat builders, colors, reinforcements, surfactants, inorganic fillers, lubricants and so on.

The core-shell polymer of the invention provides for markedly improved impact strength when melt-blended with POM resin.

Furthermore, the resin composition containing the core-shell polymer of the invention is superior to the comparable resin composition containing the known core-shell polymer used as an impact modifier in thermal stability and to the resin composition containing an urethane elastomer in fluidity, thermal stability, strength and elongation on the weld line, weatherability and an apparance.

The strength and elongation on the weld line are improved in this invention.

EXAMPLES

The following examples and comparative examples are intended to illustrate the invention in further detail and should by no means be construed as limiting the metes and bounds of the invention. It should be understood that in these examples and comparative examples, all parts are by weight and the following abbreviations are used.

| | |
|---|---|
| n-Butyl acrylate | BA |
| Ethyl acrylate | EA |
| Methyl methacrylate | MMA |
| Vinyl acetate | VAc |
| Butadiene | Bd |
| Glycidyl methacrylate | GMA |
| 2-Ethylhexyl acrylate | 2EHA |
| Hydroxyethyl methacrylate | HEMA |
| Allyl methacrylate | AlMA |
| 1,4-Butylene glycol diacrylate | BGA |
| Deionized water | DIW |
| Polyoxyethylene nonylphenyl ether (Emulgen 950, Kao Corporation) | E950 |
| Polyoxyethylene nonylphenyl ether (Emulgen 985, Kao Corporation) | E985 |
| Polyoxyethylene lauryl ether (NOIGEN YX-500, Dai-ichi Kogyo Seiyaku Co. Ltd.) | YX500 |
| Polyoxyethylene monostearate (Nonion S-40, Nippon Oil & Fats Co. Ltd.) | S40 |
| Polyoxyethylene sorbitan monolaurate (Nonion LT-221, Nippon Oil & Fats Co. Ltd.) | LT221 |
| Polyoxyethylene polyoxypropylene brock polymer (Epan 785, Dai-ichi Kogyo Seiyaku Co. Ltd.) | EPN |
| Sodium octylsulfosuccinate (Neocol P, Dai-ichi Kogyo Seiyaku Co. Ltd.) | NP |
| Sodium hydrogen carbonate | SBC |
| 2,2'-Azobis(methylisobutyrate) (V601, Wako Pharm. Corp.) | V601 |
| 2,2'-Azobis(2-aminopropane).HCl (V50, Wako Pharm. Corp.) | V50 |
| Hydrogen peroxide | $H_2O_2$ |
| Vitamin C (ascorbic acid) | VC |
| Sodium persulfate | SPS |

EXAMPLE 1

Production of Core-Shell Polymer A

A 5-liter polymerization vessel equipped with a reflux condenser was charged with 1125 g of DIW and 135 g of a 10% aqueous solution of E950 and the mixture was stirred under a nitrogen stream and heated to 70° C. On the other hand, 90 g of a first-stage monomer mixture of the under-mentioned composition was mixed with 45 g of a 10% aqueous solution of E950 and 90 g of DIW and the mixture was fully emulsified with a disperser. The resulting emulsion was added to the above reaction mixture and dispersed for 10 minutes. Then, 3.6 g of V601 was added for polymerization of seed latex.

| First-stage monomer | |
|---|---|
| BA | 1792.8 g |
| AlMA | 3.6 g |
| BGA | 3.6 g |

The remaining 1710 g portion of the first-stage monomer mixture was mixed with 1500 g of a 10% aqueous solution of E950 and 525 g of DIW and the resulting monomer emulsion was continuously fed over a period of 250 minutes for seeded polymerization.

The reaction mixture was heated to 90° C. and kept for one hour, then cooled to 70° C. for second-stage polymerization.

Thus, 1.5 g of V601 was added and 1125 g of a second-stage monomer emulsion of the under-mentioned composition was continuously fed over a period of 200 minutes for seeded polymerization.

| Second-stage monomer emulsion | |
|---|---|
| MMA | 405.0 g |
| EA | 45.0 g |
| E985, 10% aqueous solution | 362.0 g |
| DIW | 313.0 g |

The reaction mixture was heated to 90° C. and kept for one hour then, cooled and filtered through a 300-mesh stainless steel sieve to give a core-shell polymer latex.

This latex was frozen at $-15°$ C. and filtered through a glass filter. The solid was then dried in a current of air at 60° C. overnight to give core-shell polymer A.

EXAMPLE 2

Production of Core-Shell Polymer B

A 5-liter polymerization vessel equipped with a reflux condenser was charged with 1320 g of DIW and 66 g of a 10% aqueous solution of E950 and the mixture was stirred under a nitrogen stream and heated to 70° C. 77 g of a first-stage monomer mixture of the under-mentioned composition was added to the above mixture and dispersed for 10 minutes. Then, 154 g of a 2% aqueous solution of V50 was added for polymerization of seed latex.

| First-stage monomer | |
|---|---|
| BA | 1533.84 g |
| AlMA | 3.08 g |
| BGA | 3.08 g |

The remaining 1463 g portion of the first-stage monomer mixture was mixed with 440 g of a 10% aqueous solution of E950 and 440 g of DIW, and the resulting monomer emulsion was continuously fed over a period of 180 minutes for seeded polymerization.

The reaction mixture was kept for one hour at 70° C., and was subject to the second-stage polymerization.

Thus, 66 g of a 2% aqueous solution of V50 was added and 1120 g of a second-stage monomer emulsion of the under-mentioned composition was continuously fed over a period of 60 minutes for seeded polymerization.

| Second-stage monomer emulsion | |
| --- | --- |
| MMA | 594.0 g |
| EA | 66.0 g |
| E950, 10% aqueous solution | 220.0 g |
| DIW | 440.0 g |

The reaction mixture was heated to 80° C. and kept for one hour then, cooled and filtered through a 300-mesh stainless steel sieve to give a core-shell polymer latex.

This latex was frozen at −15° C. and filtered through a glass filter. The solid was then dried in a current of air at 60° C. overnight to give core-shell polymer B.

EXAMPLE 3

Production of Core-Shell Polymer C

A 2-liter polymerization vessel equipped with a reflux condenser was charged with 600 g of DIW and 20 g of a 10% aqueous solution of YX500 and the mixture was stirred under a nitrogen stream and heated to 35° C. A monomer mixture of 35 g of VAc and 15 g of EA was added to the above mixture and dispersed for 10 minutes. 12 g of a 3% aqueous solution of H202 and 12 g of a 2% aqueous solution of VC were added for polymerization of seed latex.

665 g of a first-stage monomer mixture of the under-mentioned composition was mixed with 135 g of a 10% aqueous solution of YX500 and 95 g of DIW. Then, the mixture was fed to the reaction mixture over a period of 240 minutes, followed by 72.5 g of a 3% aqueous solution of $H_2O_2$ and 72.5 g of a 2% aqueous solution of VC were continuously fed over a period of 300 minutes for seeded polymerization. While the monomer solution was fed, the reaction temperature was kept at the range from 35° C. to 40° C.

| First-stage monomer | |
| --- | --- |
| BA | 697.20 g |
| AlMA | 1.40 g |
| BGA | 1.40 g |

The reaction mixture was kept for one hour at the same temperature after the finish of feeding monomers, and was subjected to the second-stage polymerization.

32.9 g of a 3% aqueous solution of $H_2O_2$ and 32.9 g of VC was fed to the reaction mixture over a period of 150 minutes, and 431 g of a second-stage monomer emulsion of the under-mentioned composition was continuously fed over a period of 90 minutes for seeded polymerization. While the monomer solution was fed, the reaction temperature was kept at the range from 35° C. to 40° C.

| Second-stage monomer emulsion | |
| --- | --- |
| MMA | 253.8 g |
| EA | 28.2 g |
| YX500 10% aqueous solution | 47.0 g |
| DIW | 102.0 g |

The reaction mixture was kept for one hour at the same temperature, then, cooled and filtered through a 300-mesh stainless steel sieve to give a core-shell polymer latex.

This latex was frozen at −15° C. and filtered through a glass filter. The solid was then dried in a current of air at 60° C. overnight to give core-shell polymer C.

EXAMPLE 4

Production of Core-Shell Polymer D

A 5-liter autoclave was charged with 1,000 g of DIW and 24 g of a 10% aqueous solution of E950, and the mixture was stirred under a nitrogen stream and heated to 70° C. Fifty-six grams of a first-stage monomer mixture of the under-mentioned composition was added to the above mixture and dispersed for 10 minutes. Then, 135 g of a 2% aqueous solution of V50 was added for polymerization of seed latex.

| First-stage monomer | |
| --- | --- |
| Bd | 784 g |
| St | 336 g |

The remaining 1,096 g portion of the first-stage monomer mixture and the mixture of 100 g of 10% aqueous solution of E950 and 680 g of DIW were continuously fed over a period of 420 minutes for seeded polymerization.

Thirty-three grams of 2% aqueous solution of V50 was added and the reaction mixture was heated to 80° C. and kept for two hours.

Seven hundreds grams of DIW was slowly added and kept 70° C. Seventy-two grams of 2% aqueous solution of V50 was added and 480 g of a second-stage monomer of the under-mentioned composition was continuously fed over a period of 90 minutes for seeded polymerization.

| Second-stage monomer | |
| --- | --- |
| MMA | 333.6 g |
| St | 144.0 g |
| BGA | 2.4 g |
| DIW | 102.0 g |

The reaction mixture was heated to 80° C. and kept for one hour then, cooled and filtered through a 300-mesh stainless steel sieve to give a core-shell polymer latex.

This latex was frozen at −15° C. and filtered through a glass filter. The solid was then dried in a current of air at 60° C. overnight to give core-shell polymer D.

EXAMPLES 5 to 10

Production of Core-Shell Polymers E to J

According to the method of Example 2, core-shell polymers E to J were produced using the compositions mentioned below in Table 1.

EXAMPLE 11

Production of POM Resin Composition (1)

A mixture of 90 parts of POM copolymer resin (TENAC C3510, Asahi Chemical Industry) and 10 parts of core-shell polymer A (Example 1) was dried to a water content of 0.03% or less and using a twin-screw extruder (PCM-30, Ikegai Iron Work's), the mixture was extruded at a cylinder temperatue of 200° C. and a die head temperature of 200° C. to give pellets of POM resin composition (1).

EXAMPLES 12 to 24

Production of POM Resin Compositions (2)–(14)

In the same manner as Example 11, POM resin compositions (2)–(14) were produced according to the formulas shown in Table 2.

EXAMPLE 25

Production of POM Resin Composition (15)

Using 80 parts of POM homopolymer resin (TENAC 3010, Asahi Chemical Industry) and 20 parts of core-shell polymer A (Example 1), the procedure of Example 12 was followed to give POM resin composition (15) according to the formula shown in Table 2.

COMPARATIVE EXAMPLE 1

Production of POM Resin Composition (16)

Using an impact modifier L (KM330, Rohm & Haas Co.) and POM copolymer resin, POM resin composition (16) was produced and pellets were then prepared.

COMPARATIVE EXAMPLE 2

Production of POM Resin Composition (17)

Using an urethane elastomer as an impact modifier M (T-680, Takeda-Badisch Urethane Industries Ltd.) and POM copolymer resin, POM resin composition (17) was produced and pellets were prepared.

COMPARATIVE EXAMPLE 3

Production of Core-Shell Polymer N and POM resin composition (18)

A 5-liter polymerization vessel equipped with a reflux condenser was charged with 1125 g of DIW, 50 g of a 1% aqueous solution of NP and 100 g of a 1% aqueous solution of SBC and the mixture was heated to 70° C. with stirring under a nitrogen stream.

Then, 100 g of a first-stage monomer mixture of the under-mentioned composition was added and dispersed over a period of 10 minutes and 200 g of a 2% aqueous solution of SPS was then added for polymerization of seed latex.

| First-stage monomer | |
|---|---|
| BA | 1992 g |
| AlMA | 4.0 g |
| BGA | 4.0 g |

Then, the remaining 1900 g portion of the first-stage monomer mixture was mixed with 1125 g of 1% aqueous solution of NP and 100 g of 1% aqueous solution of SBC and the resulting monomer emulsion was continuously fed to the reaction vessel over a period of 120 minutes for seeded emulsion polymerization.

The reaction mixture was heated to 90° C. and kept for one hour, then cooled to 70° C. The second-stage polymerization was initiated at 70° C.

Thus, 50 g of 2% aqueous solution of SPS was added and 775 g of a second-stage monomer emulsion of the under-mentioned composition was continuously fed over a period of 45 minutes for seeded emulsion polymerization.

| Second-stage monomer emulsion | |
|---|---|
| MMA | 450.0 g |
| EA | 50.0 g |
| NP, 1% aqueous solution | 225.0 g |
| SBC, 1% aqueous solution | 50.0 g |

The reaction mixture was heated to 90° C. and kept for one hour, and cooled and filtered through a 300-mesh stainless steel sieve to give a core-shell polymer latex.

The above latex was frozen at −15° C., filtered through a glass filter and dried in a current of air at 60° C. overnight to give core-shell polymer N.

Using this core-shell polymer N and POM copolymer resin, POM resin composition (18) was produced and pellets were prepared.

COMPARATIVE EXAMPLE 4

Production of Core-Shell Polymer K

According to the method of Example 2, core-shell polymer K was produced using the composition mentioned below in Table 1.

COMPARATIVE EXAMPLE 5

Production of POM Resin Composition (19)

In the same manner as Example 11, POM resin compositions (19) was produced according to the formulas shown in Table 2. But, the melt-blended resin composition was colored as yellow and its thermal stability was very poor.

Impact Strength Test of Resin Compositions

Each of resin compositions (1) to (15) and (17) was dried at 120° C. for 4 hours and, then, molded with an injection molding machine (TS-100, Nissei Resin) at a cylinder and nozzle temperature of 200° C. The molding was notched by machining to prepare Izod impact strength testpieces, 3.2 mm thick and 6.4 mm thick, according to JIS K7110. The impact values of these testpieces at 23° C. were measured by the procedure directed in JIS K7110.

POM resin compositions (16) and (18) (Comparative Examples 1 and 3) were found to be not melt-blendable because POM resion was decomposed terribly, while POM resin composition (18) (Comparative Example 2) was unsatisfactory in thermal stability and fluidity.

The blending results are shown in Table 2.

Determination of Anion in Core-Shell Polymers

An amount of sulfate anion was determined by the method which comprises stirring 5 g of core-shell polymers in 20 ml of distilled water for 3 hours at room temperature, filtering the core-shell polymer solution to obtain filtrate, dividing the filtrate into two parts of the same volume, adding 0.1 ml of 1% barium chloride aqueous solution into one part of the filtrate and comparing the solution with another filtrate.

The sulfate anion in the core-shell polymers A to J were not detected. The core-shell polymer A to J substantially contain no sulfate anion.

The precipitation yielded by sulfate anion contained in the core-shell polymer L and N were observed.

The amount of halogen anion was determined by the method which comprises stirring 5 g of core-shell polymers in 20 ml of distilled water for 3 hours at room temperature, filtering the core-shell polymer solution to obtain filtrate, dividing the filtrate into two parts of the same volume, adding 0.5 ml of 0.1N silver nitrate aqueous solution into one part of the filtrate and comparing the solution with another filtrate.

The halogen anion in the core-shell polymers A to J were not detected. The core-shell polymer A to J substantially contain no anion.

It was known that the core-shell polymer K has metal carboxylate at the detectable amount calculated according to an amount of surfactant to be used for producing it.

Measurement of the Ratio of Weld and Non-Weld Elongation

The ratio of weld and non-weld elongation was determined, according to JIS K 7113 by the ratio of the tensile elongation using the specimen which has two gate points at the both edges and the tensil elongation using the specimen which has one gate point at the edge.

Weatherability Test

The color difference between non-exposed and exposed injection molded specimen by the Sunshine Super Long-Life Weather Meter ® (Suga Test Instruments) was measured using Σ80 Color Measuring System ® (Nippon Denshoku Kogyo).

TABLE 1

Compositions of Core-Shell Polymers

| Impact Modifier | Ex. No. 1 A | 2 B | 3 C | 4 D | 5 E | 6 F | 7 G | 8 H | 9 I | 10 J | Comp. Ex. 3 N | Comp. Ex. 4 K |
|---|---|---|---|---|---|---|---|---|---|---|---|---|
| Core | | | | | | | | | | | | |
| BA | 69.72 | 69.72 | 66.57 | — | 79.44 | — | 74.475 | 69.51 | 69.51 | 69.51 | 79.68 | 69.51 |
| BGA | 0.14 | 0.14 | 0.13 | — | 0.16 | 0.15 | 0.15 | 0.14 | 0.14 | 0.14 | 0.16 | 0.14 |
| AlMA | 0.14 | 0.14 | 0.13 | — | 0.40 | 0.375 | 0.375 | 0.35 | 0.35 | 0.35 | 0.16 | 0.35 |
| Bd | — | — | — | 56.0 | — | — | — | — | — | — | — | — |
| St | — | — | — | 14.0 | — | — | — | — | — | — | — | — |
| EA | — | — | 3.52 | — | — | — | — | — | — | — | — | — |
| 2EHA | — | — | — | — | — | 74.475 | — | — | — | — | — | — |
| VAC | — | — | 1.51 | — | — | — | — | — | — | — | — | — |
| Core/MID//Shell | 70//30 | 70//30 | 72//28 (71.86) | 70//30 | 80/0.5//20 | 75//25 | 75/20//5 | 70//30 | 70//30 | 70//30 | 80//20 | 70//30 |
| Intermediate Phase (MID) | | | | | | | | | | | | |
| GMA | — | — | — | — | 0.5 | — | — | — | — | — | — | — |
| MMA | — | — | — | — | — | — | 16.96 | — | — | — | — | — |
| EA | — | — | — | — | — | — | 3.0 | — | — | — | — | — |
| BGA | — | — | — | — | — | — | 0.04 | — | — | — | — | — |
| AlMA | — | — | — | — | — | — | — | — | — | — | — | — |
| Shell | | | | | | | | | | | | |
| MMA | 27.0 | 27.0 | 25.33 | 20.85 | 16.96 | 21.20 | 3.99 | 25.44 | 25.44 | 25.44 | 18.0 | 25.44 |
| EA | 3.0 | 3.0 | 2.81 | — | 3.0 | 3.75 | 0.75 | 4.50 | 4.50 | 4.50 | 2.0 | 4.50 |
| BGA | — | — | — | 0.15 | 0.04 | 0.05 | 0.01 | 0.06 | 0.06 | 0.06 | — | 0.06 |
| HEMA | — | — | — | — | — | — | 0.25 | — | — | — | — | — |
| St | — | — | — | 9.0 | — | — | — | — | — | — | — | — |
| Surfactant | E950 | E950 | YX500 | E950 | E950 | E950 | E950 | S-40 | LT221 | EPN | NP | OS |
| Polymerization Initiator | V601 | V50 | H2O2/VC | V50 | V50 | V50 | V50 | V50 | V50 | V50 | SPS | V50 |

TABLE 2

| Examples | Ex. 11 | Ex. 12 | Ex. 13 | Ex. 14 | Ex. 15 |
|---|---|---|---|---|---|
| Resin composition | (1) | (2) | (3) | (4) | (5) |
| Impact Modifier | (A) | (A) | (A) | (A) | (A) |
| Ratio of POM to impact Modifier | 90/10 | 80/20 | 70/30 | 60/40 | 50/50 |
| Izod impact (Kgf·cm/cm) | | | | | |
| 3.2 mm thick | 9.4 | 11.5 | 11.7 | 14.3 | 15.4 |
| 6.4 mm thick | 9.4 | 10.5 | 9.8 | 11.2 | 13.0 |
| Ratio of weld and non-weld elogation (%) | — | — | — | — | — |
| Color difference (ΔE) | 2.61 | 2.28 | 1.12 | 1.05 | 0.96 |

| Examples | Ex. 16 | Ex. 17 | Ex. 18 | Ex. 19 | Ex. 20 |
|---|---|---|---|---|---|
| Resin composition | (6) | (7) | (8) | (9) | (10) |
| Impact Modifier | (B) | (C) | (D) | (E) | (F) |
| Ratio of POM to impact Modifier | 80/20 | 80/20 | 80/20 | 80/20 | 80/20 |
| Izod impact (Kgf·cm/cm) | | | | | |
| 3.2 mm thick | 11.0 | 10.6 | 15.3 | 11.7 | 11.9 |
| 6.4 mm thick | 9.1 | 8.2 | 12.4 | 8.2 | 11.2 |
| Ratio of weld and non-weld elogation (%) | 120 | — | — | 80 | — |
| Color difference (ΔE) | 2.17 | 2.15 | — | — | — |

| Examples | Ex. 21 | Ex. 22 | Ex. 23 | Ex. 24 | Ex. 25 |
|---|---|---|---|---|---|
| Resin composition | (11) | (12) | (13) | (14) | (15) |
| Impact Modifier | (G) | (H) | (I) | (J) | (A) |
| Ratio of POM to impact Modifier | 80/20 | 80/20 | 80/20 | 80/20 | 80/20 |
| Izod impact (Kgf·cm/cm) | | | | | |
| 3.2 mm thick | 13.3 | 10.8 | 10.5 | 10.6 | 13.5 |
| 6.4 mm thick | 9.3 | 8.7 | 8.8 | 8.4 | 11.6 |
| Ratio of weld and non-weld elogation (%) | 95 | — | — | — | — |
| Color difference (ΔE) | — | — | — | — | — |

| Comparative Examples | Comp. Ex. 1 | Comp. Ex. 2 | Comp. Ex. 3 | Comp. Ex. 5 | Control |
|---|---|---|---|---|---|
| Resin composition | (16) | (17) | (18) | | |
| Impact Modifier | L | M | N | K | None |
| Izod impact (Kgf·cm/cm) | | | | | |
| 3.2 mm thick | — | 12.4 | — | — | 4.5 |
| 6.4 mm thick | — | 9.6 | — | — | 5.5 |
| Ratio of weld | — | <0.6 | — | — | 55 |

TABLE 2-continued

| | | | | |
|---|---|---|---|---|
| and non-weld elogation (%) | | | | |
| Color difference ($\Delta E$) | — | 16.54 | — | — | 2.96 |

(Note) Control: Pellets of POM copolymer resin alone

What we claimed is:

1. A polyoxymethylene resin composition which comprises:

(A) a core-shell polymer comprising (1) a rubbery polymer core consisting essentially of (a) a conjugated diene, (b) a $C_{2-8}$ alkyl acrylate, (c) a mixture of $C_{2-8}$ alkyl acrylates, (d) a mixture of a conjugated diene and a $C_{2-8}$ alkyl acrylate or (e) a mixture of (a) or (b) and at least one monomer copolymerizable therewith selected from the group consisting of an aromatic vinyl monomer, an aromatic vinylidene monomer, a vinyl cyanide, a vinylidene cyanide and an alkyl methacrylate and (2) a glassy polymer shell which is formed from methyl methacrylate or a mixture of methyl methacrylate and at least one monomer copolymerizable therewith selected from the group consisting of an alkyl acrylate, an alkyl methacrylate, an aromatic vinyl monomer, an aromatic vinylidene monomer, a vinyl cyanide and a vinylidene cyanide, the transition temperature of the glassy polymer being not less than 60° C. and the core-shell polymer having substantially no detectable anion, and (B) a polyoxymethylene resin.

2. A polyoxymethylene resin composition as claimed in claim 1, wherein the anion detection method comprises stirring 5 g of the core-shell polymer in 20 ml of distilled water for 3 hours at room temperature, adding 0.1 ml of 1% barium chloride aqueous solution to the extracted sample solution, and observing whether precipitation appears or not.

3. A polyoxymethylene resin composition as claimed in claim 1, wherein the anion detection method comprises stirring 5 g of the core-shell polymer in 20 ml of distilled water for 3 hours at room temperature, adding 0.5 ml of 0.1N silver nitrate aqueous solution to the extracted sample solution, and observing whether precipitation appears or not.

4. A polyoxymethylene resin composition as claimed in claim 1, wherein the transition temperature of the rubbery polymer in the core-shell polymer is not over $-30°$ C.

5. A polyoxymethylene resin composition as claimed in claim 1, wherein the transition temperature of the glassy polymer in the core-shell polymer is not less than 60° C.

6. A polyoxymethylene resin composition as claimed in claim 1, wherein the amount of the glassy polymer is from 10 to 50 weight % per the whole core-shell polymer.

* * * * *